2,821,225

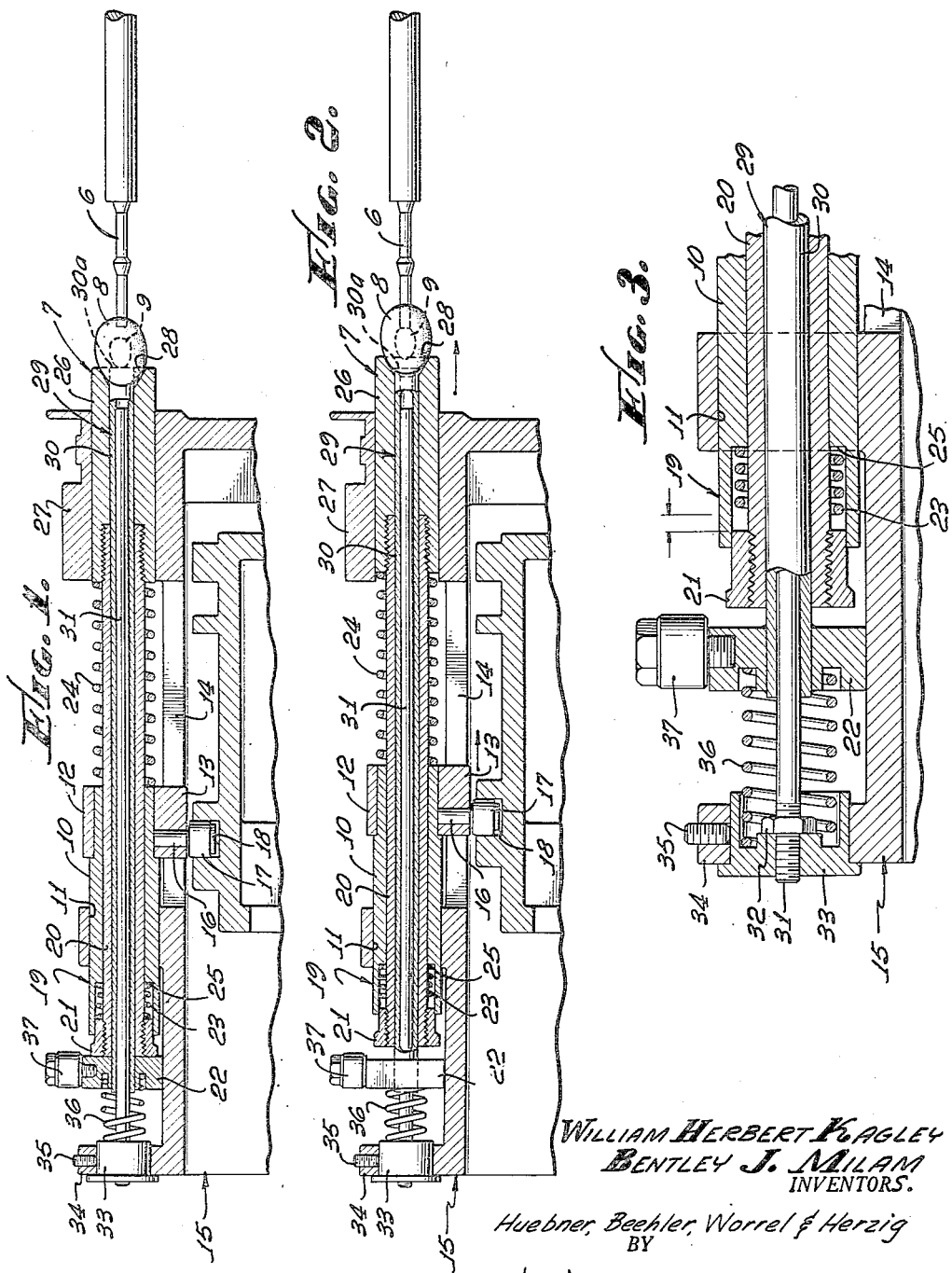

SHOCK ABSORBER FOR FRUIT PITTING
              MACHINE DIE ASSEMBLY

William Herbert Kagley, Lindsay, and Bentley J. Milam,
   Strathmore, Calif., assignors to Lindsay Ripe Olive
   Company, Lindsay, Calif., a corporation of California Application October 17, 1955, Serial No. 540,743

2 Claims. (Cl. 146—27)

The present invention relates to a machine for pitting fruit, such as olives, and in particular to improvements over certain features of the invention described and claimed in United States Patent of Edward P. Drake, Fred J. Alberty, and William H. Kagley, No. 2,341,857, granted February 15, 1944, for Fruit Pitting Machine.

In removing pits from olives by a machine of the type identified above, the olives are individually, firmly grasped in a predetermined, aligned position while a punch enters from one end of the olive and is forced longitudinally therethrough. During this operation, the olive is forced against an advancing forward die member by the punch. The olive pit is pushed out through the end of the olive by the mutual action of punch and die into a bore in the forward die member.

Occasionally, due to an olive abnormally hard to pit, or due to misalignment of the olive, the olive pit strongly resists being pushed into the bore of the forward die member. This resistance causes an abnormal degree of pressure to be brought to bear upon the forward die member. This pressure urges the forward die member backward toward a rearward die member and causes an excessive loading of a compression spring (267 in Patent No. 2,341,857) used to maintain a variable separation between the forward die member and the rearward die member. The backward movement of the forward die member results in a corresponding separation between a stop nut threaded on the rear end of a sleeve connected to the forward die member and the rear end of an outer sleeve of the rearward die member. Upon suddenly pitting or crushing the olive, or expelling it from the mouth of the forward die member, the forward die member, sleeve and stop nut assembly is shot forward as a result of the abnormal loading of the compression spring mentioned above. The stop nut suddenly halts the forward motion of this assembly by sharply striking against the rear end of the outer sleeve of the rearward die member. The sudden stopping of the forward momentum of the die, sleeve and nut assembly in this manner produces a severe mechanical shock in the stop nut. Repeated shocks of this type eventually may strip the stop nut from the end of the sleeve of the forward die member and render the die assembly inoperative for further pitting operations.

Accordingly, an important object of the invention is to provide, in a machine of this general character, a rearward die member with a resilient shock absorbing or cushioning means designed to cushion the blow of the stop nut, occurring in the manner described above, against the outer sleeve of the rearward die member and thus avoid injury to the stop nut and the sleeve connected to the forward die member.

Another object is to provide in such a machine a shock absorber means adjacent the rear end of the outer sleeve of the rearward die member.

Other objects and advantages will appear from the further description in the specification and the illustration in the drawing.

In the drawing:

Figure 1 is a detailed longitudinal section of a die, coring tool, fragment of a punch, and immediately associated parts with the parts in position just after receiving an olive at which the coring tool has advanced to make a deep incision in the olive;

Figure 2 is a view similar to Figure 1 with the parts in position as the punch commences to push the pit through the end of the olive into a bore in the die while the olive is forced against the punch by the die; and Figure 3 is an enlarged detail view of the rear portion of Figure 2 showing more clearly a shock-absorbing compression spring in the rearward end of the die assembly.

The punches 6 and dies or die assemblies 7 of the fruit pitting machine are reciprocally mounted circumferentially in spaced relationship with respect to each other on each of two drums 15 (part of one is shown). The punches and dies are arranged on the peripheral portions of the drums 15 in alternating relationship. The drums, in turn, are rotatably mounted in axially spaced relationship with respect to each other so that the punches on one drum are positioned axially opposite the dies on the other drum, and the dies on the first-mentioned drum are axially opposite the punches on the second-mentioned drum. This is accomplished by rigidly connecting the two axially spaced drums at their inner ends so that they rotate together as a unit. A motor (not shown), and a gear train (not shown), connecting one of the drums 15 to the motor, are used to furnish the power for rotating the drums together as a unit.

The olives are spaced and fed to olive gripping means (not shown) which firmly grasp individual olives and align each olive 8 in a predetermined position between each pair of oppositely oriented reciprocal punches 6 and dies 7. During the continuous cyclic operation of the fruit pitting machine, the punch 6 enters the olive 8 from one end and is forced longitudinally therethrough. The punch 6 forces the olive against the die 7 and the pit 9 is pushed out through the end of the olive, while the olive is supported and pushed against the punch by advancement of the die, into a central bore passing through the die. The pit 9 and the pitted olive are separately expelled from the fruit pitting machine and are collected in separate receptacles.

In the present machine, each die assembly 7 contains an outer rear sleeve 10 slidably fitting in a bearing 11. A collar 12 encloses a portion of the sleeve and is attached thereto. This collar has a rectangular shank 13, which is arranged to slide in a longitudinal guide slot 14 in the drum 15. Extending from the shank is a stub shaft 16, upon which is mounted a roller 17 which extends into and engages the raceway of a stationary die cam 18 as the drum rotates carrying with it the die assemblies. The roller or cam follower 17 travels through the raceway over a varying path during repeated cycles of operations. During these cycles, the drum 15 rotates around the die cam 18 which is formed on the outer surface of a stationary cam barrel mounted concentrically inside the rotatably mounted drum.

Slidably mounted within the cam actuated outer rear sleeve 10 is an inner sleeve 20 which has a stop nut 21 threaded on the rear end thereof to slide within the rearward end of the outer sleeve 10. A shock absorber relatively short compression spring 23 is disposed and confined within the rearward counter bored end of the outersleeve 10 around the inner sleeve 20. The counterbore referred to terminates at shoulder 25. The spring 23 cushions any shock that may be produced in stop nut 21 by the rear end of the rearward sleeve 10 of the die assembly, to thus prevent any shearing of the threads of nut 21 as described above in connection with a previous machine of the same general type. It will be recalled that a sudden, forceful forward movement of the forward die member under influence of spring 24, after suddenly giving way on a misaligned olive or an olive abnormally hard to pit, previously produced a shearing action on the threads of the stop nut. In the mechanism of the present invention, however, when a hard to pit or misaligned olive is encountered, spring 23 engages the annular shoulder 25 inside sleeve 10, displaced inward from the rearward end thereof, and the outer end of the spring 23 is engaged by the end of nut 21 as it plunges into the counter bore at rearward end of sleeve 10. In this manner, spring 23 cushions any shock that otherwise would be produced in stop nut 21 and protects nut 21 from injury such as stripping the threads thereof.

The forward end of the inner die sleeve 20 extends through and beyond the end of the outer sleeve 10. At the forward end of the inner sleeve is threaded a forward die member 26, which is slidable in the flange 27. The extreme outer end of the die member 26 is countersunk to form an olive receiving cup 28. The compression spring 24, which is relatively long, encloses that portion of the inner sleeve 20 between the rear end of the die member 26 and the collar 12 to keep the forward die member 26 and the rearward (outer) die member 10 normally separated, and to cause the die member 26 to be normally advanced upon forward movement of the collar 12 under influence of the cam 18. Retraction of the die member 26 is accomplished by engagement of the inner shoulder 25 of the counter bore in the rear end of the outer sleeve 10 with the inner end of the spring 23, the outer end of which in turn engages the nut 21 threaded on the inner sleeve 20.

Slidably fitting in the bore of the inner sleeve 20 is a coring tool 29. This comprises a sleeve 30 slidably mounted on a rod 31. The rear end of the sleeve 30 is fixed in a thrust collar 22 and the rod 31 is threadedly mounted in a cap 33 aided by a locking nut 32. This cap is retained in the flange 34 by a set screw 35. The forward end of the sleeve 30 is formed with a circular cutting knife 30a.

A compression spring 36 encloses the rod and extends between the cap 33 and the thrust collar 22 normally urging the collar forward away from the cap 33.

At the upper part of the collar 22 is mounted a roller 37 which engages an auxiliary cam (not shown). This cam serves to retract the sleeve 30 of the coring tool 29 after completion of the pitting operation by the punch 6 and die 7. Subsequently, nut 21 is brought into thrust engagement with thrust collar 22, which holds the coring tool 29 in its fully retracted position until it is again urged forward at the proper point in the cycle of operations, as described above, by the action of cam 18 on the die assembly through the collar 12.

If for any reason an olive is abnormally hard to pit, or an olive should be turned with its longitudinal axis across the receiving cup 28, the punch penetrates only part way through the olive and presses the pit against the knife of the coring tool. Continued pressure results in the coring tool yielding by reason of the spring 36 and the forward die member 26 will yield by compression of the spring 24, thus preventing the parts from breaking. If the coring tool retains the olive upon retraction of the coring tool, the olive is knocked from the coring tool.

Also, upon sudden release of the obstruction presented by the olive, the additional compression in spring 24 causes the forward die member 26 to shoot forward and cause stop nut 21 to strike spring 23. Upon striking the spring, nut 21 recoils inside outer sleeve 10 against the spring 23, which acts as a cushion or a shock absorber, and absorbs the force of the blow by compression to prevent injury to nut 21. In this manner, maintenance and repair costs and machine down-time have been considerably reduced with a resulting corresponding increase in efficiency and production at reduced cost. The circumferential restriction of the spring 23 by the counter bore prevents lateral vibration of the spring which might otherwise occur.

Irrespective of any generalized use of the term "die" in the foregoing description, that word as used in the claims refers to the forward die member 26 or its equivalent.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent apparatus.

What we claim as our invention is:

1. In a fruit pitting machine, a reciprocal die axially aligned with and adapted to cooperate with a punch for removing a pit from a piece of fruit, a cam actuated sleeve, a die sleeve attached to the die and extending within and throughout the entire length of the cam actuated sleeve, a compression device surrounding the die sleeve between the cam actuated sleeve and the die, means for advancing the cam actuated sleeve to cause the compression device to force the die into engagement with a piece of fruit, said compression device being adapted to yield to permit reduction of the distance between the cam actuated sleeve and the die whenever the die engages an obstruction, the end of said cam actuated sleeve opposite said compression device having a counterbore, an annular stop device threaded on the die sleeve for limiting the travel of the die sleeve relative to the cam actuated sleeve in the direction in which the die is advanced to engage a piece of fruit, said stop device having a portion slidable in said counterbore and a resilient compression-device-resistive shock absorber spring disposed and confined in said counterbore between the stop device and the cam actuated sleeve to lessen the impact between the stop device and the cam actuated sleeve whenever the compression device is quickly released.

2. A machine as defined in claim 1 wherein said compression device is an elongated helical spring and wherein said shock absorber is a short helical spring circumferentially restricted by said counterbore to prevent lateral vibration.

References Cited in the file of this patent
UNITED STATES PATENTS

| | | |
|---|---|---|
| 783,240 | Bichler | Feb. 21, 1905 |
| 2,341,857 | Drake et al. | Feb. 15, 1944 |
| 2,700,539 | Aldrin | Jan. 25, 1955 |
| 2,747,859 | Rager | May 29, 1956 |